(12) United States Patent
Radatti

(10) Patent No.: US 7,373,643 B2
(45) Date of Patent: May 13, 2008

(54) APPARATUS, METHODS AND ARTICLES OF MANUFACTURE FOR DATA TRANSMISSION

(75) Inventor: Peter V. Radatti, Conshohocken, PA (US)

(73) Assignee: CyberSoft, Inc., Conshocken, PA (US)

( * ) Notice: Subject to any disclaimer, the term of this patent is extended or adjusted under 35 U.S.C. 154(b) by 230 days.

(21) Appl. No.: 09/800,173

(22) Filed: Mar. 6, 2001

(65) Prior Publication Data
US 2002/0170052 A1 Nov. 14, 2002

(51) Int. Cl.
*G06F 9/44* (2006.01)

(52) U.S. Cl. .................. 717/173; 717/169; 717/170

(58) Field of Classification Search ............ 717/171–3
See application file for complete search history.

(56) References Cited

U.S. PATENT DOCUMENTS

| | | | | |
|---|---|---|---|---|
| 5,919,247 A | * | 7/1999 | Van Hoff et al. | 709/217 |
| 5,950,205 A | * | 9/1999 | Aviani, Jr. | 707/103 R |
| 5,999,740 A | * | 12/1999 | Rowley | 717/173 |
| 6,006,034 A | * | 12/1999 | Heath et al. | 717/170 |
| 6,151,708 A | * | 11/2000 | Pedrizetti et al. | 717/173 |
| 6,216,175 B1 | * | 4/2001 | Sliger et al. | 717/169 |
| 6,389,592 B1 | * | 5/2002 | Ayres et al. | 717/172 |
| 6,493,871 B1 | * | 12/2002 | McGuire et al. | 717/173 |
| 6,526,574 B1 | * | 2/2003 | Jones | 717/171 |

* cited by examiner

*Primary Examiner*—Tuan Dam
*Assistant Examiner*—Michael Yigdall
(74) *Attorney, Agent, or Firm*—John F. A. Earley, III; Frank J. Bonini, Jr.; Harding, Earley, Follmer & Frailey, P.C.

(57) ABSTRACT

The present invention comprises apparatus, methods and articles of manufacture for transferring data, comprising one or more update files made available upon distribution media, such as a server, a hash of the update files made available upon the server, as well as versions of the update and hash files upon a target or client. The distribution media then transmits the hash to the target or client, the hashes are compared, and, if they do not match, the update files are downloaded for further review and updating, if desired. If updating is desired, an update mechanism will then edit and/or replace files, modules, data and/or byte sequences on the target, according to the preferred embodiments. Embodiments for various platforms, including Unix® and Windows® NT are disclosed.

17 Claims, 4 Drawing Sheets

APPARATUS, METHODS AND ARTICLES OF MANUFACTURE FOR DATA TRANSMISSION

FIELD OF THE INVENTION

The present invention relates to data transmission. More particularly, the present invention relates to data transmission over a connection where bandwidth may be limited.

BACKGROUND OF THE INVENTION

Many software companies provide online software updating and upgrading mechanisms for their software products. Using these systems is fraught with difficulties and delay, from error correction difficulties to interrupted transmissions to slow performance over online connections. For example, permitting multiple downloads of large upgrade files can cause server lag, leading to user frustration. Thus upgrade mechanisms may cause more difficulties than they solve, as error laden, incomplete and slow transmissions may lead to customer relation problems, calls to customer support, etc.

Moreover, upgrade mechanisms are often limited to updating or upgrading small parts of a software product, e.g. the nonexecutable files and databases associated with the product, because of the difficulties and delay in the mechanisms. If executable upgrades are available, the entire executable must be replaced.

The difficulties attendant to transmission are not limited to any particular size of a connection, e.g., they are not limited to 2400 baud connections, 28.8 K connections, etc. Rather, adequate bandwidth is relative, inter alia, to the size of the transmission. Therefore a bandwidth of 56 K may be adequate for email but less than adequate for streaming video. Accordingly, transmitting data across any type of connection may be difficult. Adequate bandwidth is also relative to the speed or time available for the transmission. For example, a message that may adequately be transmitted under normal conditions through the available bandwidth may be constrained by the bandwidth in emergency situations.

One example of difficult transmission technology is seen in the updating of typical antivirus software. In typical antivirus software, the main virus detection mechanism is a virus signature database, which contains the various codes of known viruses. (The typical antivirus software product uses the entries in this database to detect virus code in the programs it scans.) The virus signature database should be updated frequently as new viruses are discovered. Without frequent updates, the user of the antivirus software will be left without the latest protection. However, because of the difficulties with online updating, users may not regularly update their antivirus software, and so leave themselves at the mercy of computer viruses.

The difficulties associated with upgrading and updating technology may also mean that the vendors lose money. The users may choose not to upgrade, thus depriving the vendor of possible upgrade revenue, because of the difficulties and delay in the process.

Upgrade technology includes network administration technology. For example, it is extremely difficult to provide updates across a network because of the burden on the network and the difficulty of upgrading many machines concurrently or nearly concurrently. Moreover, daily or even hourly update inquiries would be helpful and useful but the strain of constantly ascertaining upgrade availability would likely be too great for the network.

Accordingly, it would be desirable to provide an efficient and effective update and upgrade mechanism and it is an object of the present invention to provide an efficient and effective update and upgrade mechanism with minimal operational effort required by the user.

It is a further object of the present invention to provide an efficient and effective mechanism for data transmission.

It is a further object of the present invention to provide an efficient and effective mechanism for data transmission across all ranges of bandwidth.

SUMMARY OF THE INVENTION

The present invention comprises apparatus, methods and articles of manufacture for transmitting data, including but not limited to computer software, audio, video, telemetry, data, and database objects. The present invention further comprises apparatus, methods and articles of manufacture for transmitting data, including but not limited to updating and/or upgrading computer software audio, video, telemetry, data, and database objects. New, updated or upgraded data (often comprised of files, modules, data and/or byte sequences) are made available on one or more distribution media by a distributor. In the especially preferred embodiments, the distribution media is a network.

An update file, comprised of information about the new material, is constructed and made available on the distribution media, as well as a hash of the update file. The local or client machine also contains a copy of the update file and the hash of the update file, as well as an address or other indicator of the distribution media and an update mechanism. In the especially preferred embodiments, this address is a URL where the updated files are stored on the distributor's server. These local files may have been installed when the software was installed or installed at some other time.

An update review may be requested, automatically or manually. The distribution media is contacted, through use of the locally stored address or other indicator. The hash of the update file is transmitted from the distribution media to the local machine and compared to the local version of the hash of the update file. If the versions are identical, no update is necessary. If the versions are different, the updating process may begin the update, the user or another may be notified of the need for the update, or other actions may be taken, depending upon the embodiment.

If the update process begins, the update file will first be downloaded. This file will provide the update information for the update mechanism. In certain preferred embodiments this file may be compared to the local copy of this file in order to determine what upgrades may be necessary. The update mechanism will then edit and/or replace files, modules, data and/or byte sequences, according to the preferred embodiments. In the especially preferred embodiments, the updating occurs through downloading the modules, extracting the modules, and replacing the files or byte sequences. If byte sequences are being replaced, a binary editor will replace those sequences, following directions contained in the modules.

Additionally, the present invention comprises apparatus, methods and articles of manufacture for verification of various file attributes including but not limited to file integrity, versions and the need and/or appropriateness of any specific upgrade. In certain preferred embodiments, if a specific product update is inappropriate for the client, the embodiment will review the client software product attributes, attempt to determine which update is appropriate, locate the appropriate update on the distribution media and apply the update.

DETAILED DESCRIPTION OF THE PREFERRED EMBODIMENTS

The present invention comprises apparatus, methods and articles of manufacture for transmitting, transferring, updating and/or upgrading (hereinafter the word "update" and its variants is used to include the terms "transmit," "transfer," "update" and/or "update" and their variants) data including but not limited to computer software, audio, video, telemetry, data, and database objects (hereinafter "code") by way of distribution media, which includes but is not limited to telephone connections, radio, cable, and other wired and wireless network connections. In the especially preferred embodiments, the updating occurs over a wired or wireless network using a server or servers as the distribution media, however, in other embodiments, various other types of distribution media may be used (e.g., hard disks, floppy disks, CD, DVD, tape, Zip® disks, etc.).

Although the present invention can be implemented on various platforms, the preferred embodiments are used in Unix® and various Windows® environments, such as NT, 2000, 95, 98 and Me. It should be specifically understood that embodiments can be implemented in other Unix® and Unix®-like platforms, including but not limited to Linux® and its variants, as well as other operating system platforms including but not limited to IBM OS/390, MacOS, VxWorks® and others. Moreover, those skilled in the art will appreciate that the invention may be practiced with other electronic device and computer system configurations, including hand-held devices, digital audio and video devices, distributed computing environments, multi-processor systems, and microprocessor based or programmable consumer electronics, such as smart printers, network PCs, minicomputers, mainframe computers, and the like.

In the preferred embodiments installed in a Unix® environment, the code comprises a software product that may be updated that is installed on a client or target system (the terms "client" and "target" are used interchangeably herein.) The software product comprises various files on the client system.

An update system is also installed on the client machine. In the preferred embodiments, the update system is comprised of: a client update_manager, one or more client update_index file and one or more client update_hash file. (Of course, the file names may differ in different embodiments, as described in more detail below.)

The client update_manager performs various functions as set forth below.

The client update_index file may be of variable size, and is comprised of one or more data information records. Each record is comprised of, in the preferred embodiment, a:
 module_name,
 a file name for that module (which may be the same as the module name),
 a version number for that module,
 a processing flag,
 a comment, and,
 a hash of the module.
The records contain these fields in the following format:
 module_name:file_name:version_number:process_flag:comment:hash.

Further description on these fields is presented below. There may be one or more of these update_index files in various embodiments. For example, in certain embodiments, a number of software products may be present on the computer system and each product may have its own update_index file. Alternatively, in other embodiments, one update_index file may contain information on more than one software product. In yet other embodiments, the update_index may refer to other update_index files. This referential update_index file structure may provide a hierarchical tree structure and use a single update_index file to define an entire set of files for updates.

The client update_hash file is comprised of, in this embodiment, a hash of the update_index file, preferably a cryptographic hash. This update_hash file is usually very small, for example, from 50 to 150 bytes. There may be one or more of these update_hash files in various embodiments. For example, in certain embodiments, a number of software products may be present on the computer system and each product may have its own update_hash file. Alternatively, in other embodiments, one update_hash file may contain information on more than one software product.

The server also has data, which in this embodiment comprise one or more update_index files and one or more update_hash files, as well as the server software product files. The server software product files are the latest updates, and the server update_index file or files and the server update_hash file or files are constructed with information about the updated server software product files.

In this and other preferred embodiments, data on the server is comprised of data information, which in the especially preferred embodiments is present as an update_index file, (or file with some other name) containing information about the software product such as file name(s), version number(s), etc. that is generated manually or automatically, and subsequently made available from the server or other distribution media. Data on the server also comprises "meta" data information, or information about the data information, such as, in the preferred embodiments, a hash of the data information. In the especially preferred embodiments, this hash is called update_hash, however, it may have of course other names in other embodiments. It should also be understood that in some embodiments the hash and data information file may be present in a single file. It should also be understood that any hash or hash files, data information files and software products are preferably, but not necessarily available on the same distribution media. For example, a hash file may be present on CD-ROM, while a data information file and software product may be present on a network server.

The distribution media data and target data are, in any particular embodiment, similar. So for example, in the preferred embodiments, any server update_index file and server update_hash file is generally in the same format, respectively, as client update_index and update_hash. Thus, server update_index is comprised of, in the preferred embodiment, information records in the following format:
 module_name,
 a file name for that module (which may be the same as the module name),
 a version number for that module, a processing flag,
a comment, and,
a hash for the module.

The records contain these fields in the following format:
module_name:file_name:version_number:process_flag: comment:hash.

Further description on these fields is presented below. There may be one or more of these update_index files in various embodiments. For example, in certain embodiments, a number of software products may be present on the server and each product may have its own update_index file. Alternatively, in other embodiments, one update_index file may contain information on more than one software product. In yet other embodiments, the server update_index will refer to other update_index files. This referential update_index file structure may provide a hierarchical tree structure and use one update_index file to define an entire set of files for updates.

The server update_hash is comprised of, in this embodiment, a hash of the update_index file, preferably a cryptographic hash. This update_hash file is usually very small, for example, from 50 to 150 bytes. There may be one or more of these update_hash files in various embodiments. For example, in certain embodiments, a number of software products may be present on the server and each product may have its own update_hash file. Alternatively, in other embodiments, one update_hash file may contain information on more than one software product.

Figure 1:
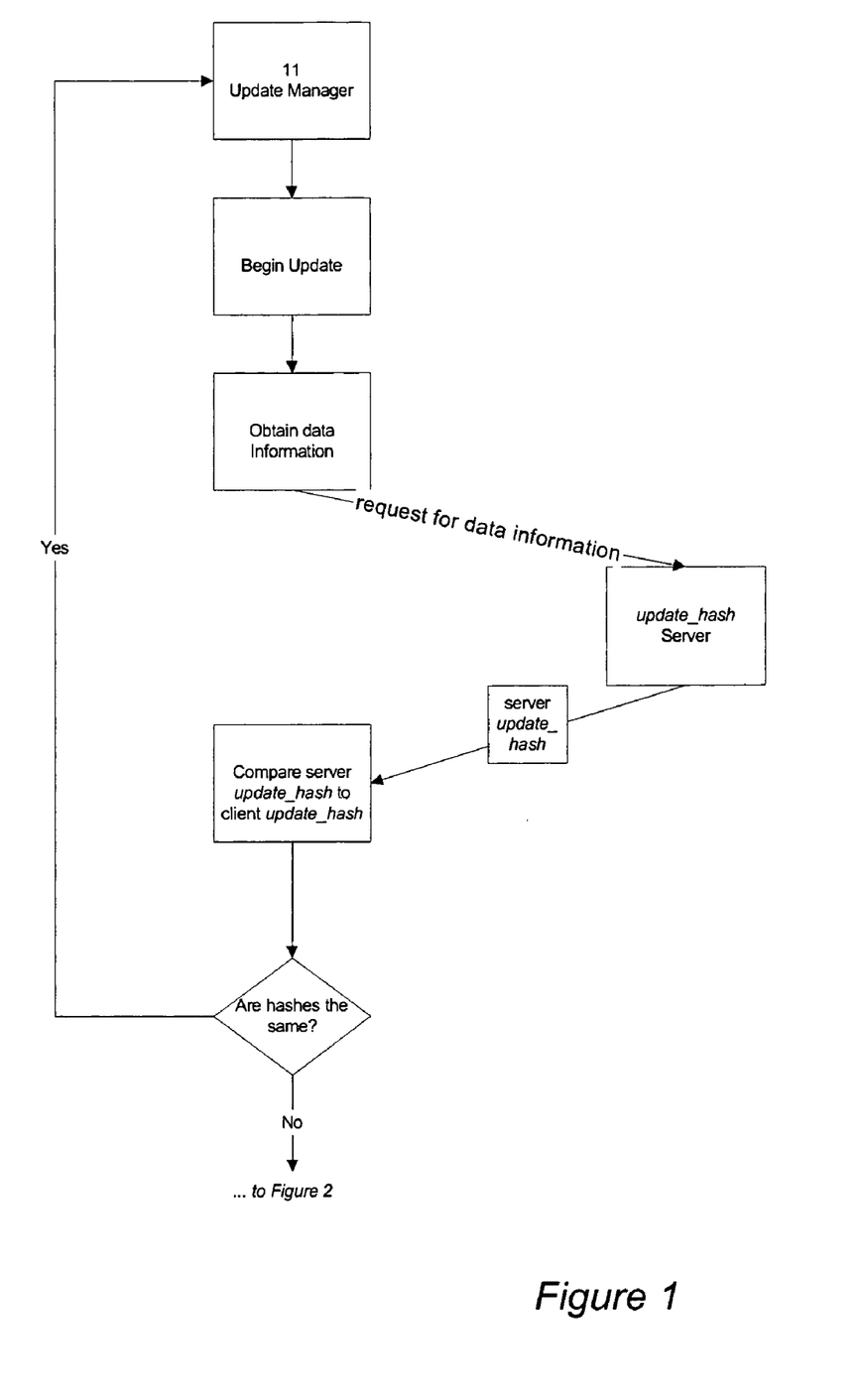
FIG. 1 is a schematic diagram of a process of the preferred embodiment.

FIG. 1 shows the process of a preferred embodiment. update_manager 11 is present on the client system. update_manager 11 obtains data information from the server in the preferred embodiments by sending a request for data information to the update server. In this especially preferred embodiment, this request for data information is done by the update_manager's construction and execution of a "http get" of the server's update_hash file, comprised of the name of the update server for the product, the product name, and version number, e.g., http://update.cybersoft.com/verygood-program/1.0/update_hash.

It should be noted that in other embodiments, the data information can be obtained through various other mechanisms. For example, the data information can be obtained by various commands, e.g., file open, socket open, stream open, or by any other mechanism by which data information can be obtained. Moreover, modifications of existing obtain data information mechanisms are possible. For example, if the embodiment uses a http type mechanism to obtain data information from the server, yet the address called by the http type mechanism is not available, the server, through use of a translation table, can translate the requested address into a different address.

It should be noted that the execution of the update review requires very few system resources. For example, the initial transmit of the update_hash file occurs very quickly in this embodiment, even where very limited bandwidth is used, because the file is very small, for example, from 50 to 150 bytes. In other embodiments, the size and transmit mechanisms may be changed, however, in these embodiments the relevant data information also is provided through the transmission of minimal data. Minimizing transmit data also minimizes server load in this and other embodiments.

The server update_hash file is then processed. In this embodiment the server update_hash file is processed by comparing the file with the client update_hash file using the update_manager in order to determine whether there has been a change in the data information. Since the hash files are constructed from the update_index files, which in turn is constructed from software product data information, a match between the hash files indicates the files are the same, and no changes have taken place. No further action need be taken. Of course, in other embodiments, the system may notify the user, administrator or another, and/or write to a log, that there has been a review of the server or other distribution media for updates. Moreover, in the preferred and other embodiments, the update review may be executed on a scheduled and/or triggered basis, at the option of the user, administrator and/or another. Of course, other automatic and/or manual alternatives for execution are available. For example, embodiments may be used as network administration tools as well. An embodiment that automatically begin update reviews in a local network or enterprise, for example, permits synchronization of the machines in the network or enterprise by updating code on the machines. This or another embodiment might also provide for identical configurations of machines, to update any code, including but not limited to kernels, Registries, hard drives, databases, etc. Additionally, various network configuration uses are possible including but not limited to initial machine, system or network configuration through updating operating code, etc.

Figure 2:
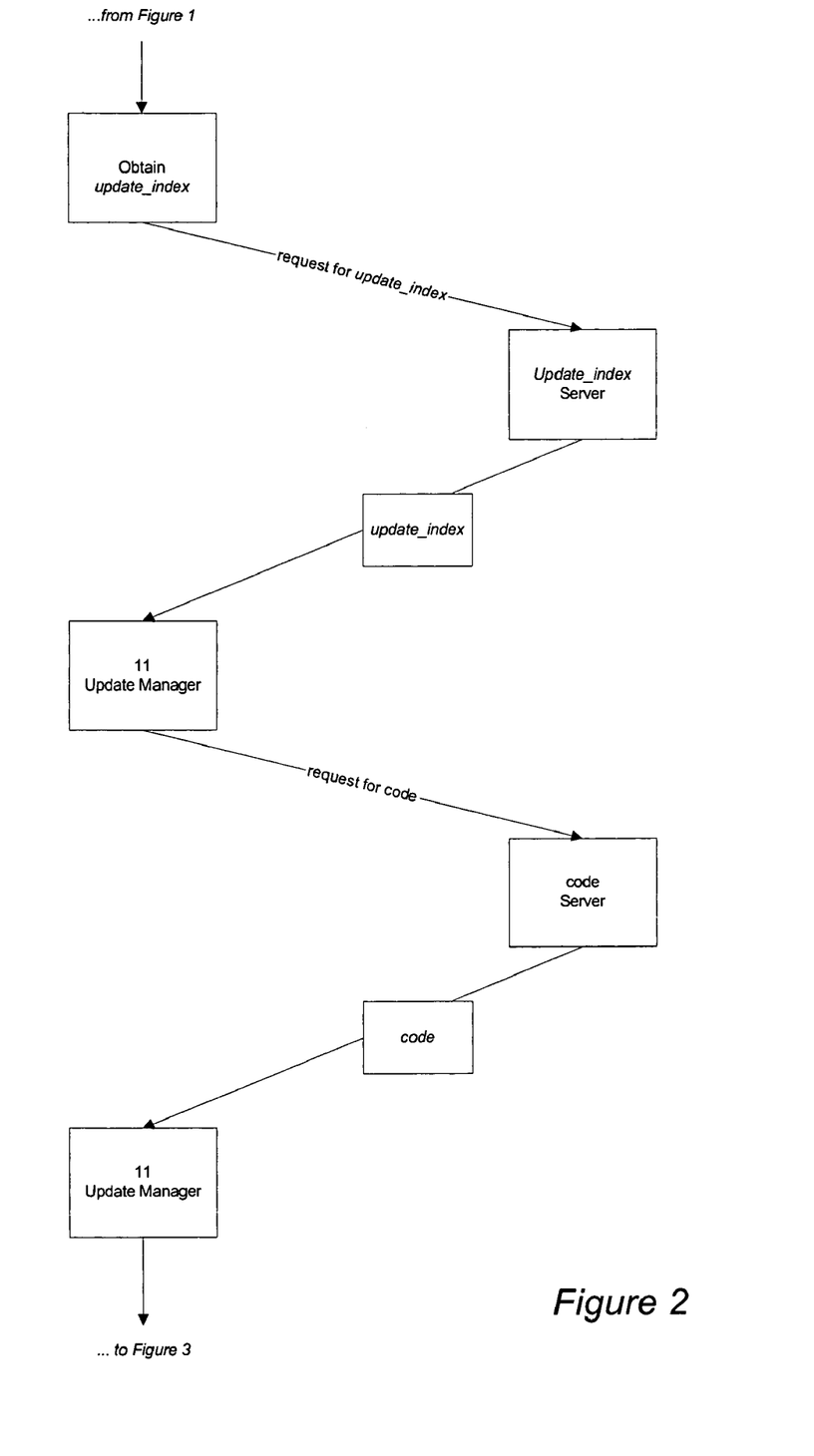
FIG. 2 is a schematic diagram of a process of the preferred embodiment.

A mismatch between the hash files means the server update_index and the client update_index are different. The user or another entity may be notified of the difference, depending on the embodiment. The embodiment will then proceed, through the update_manager 11, to request the server's update_index, as seen in FIG. 2. Of course, in other embodiments, a server file, comprising relevant data information including but not limited to file name, etc. may have already been transmitted as part of the initial comparison and execution process.

The server's update_index provides, in this embodiment, data information, and will provide the update information for the update_manager 11. As described above, the update_index is comprised of information in the following format:
module_name:file_name:version_number:process_flag: comment:hash.

The field module_name is provided by the update creator. This embodiment uses modules to assist in the updating process as is explained further below. Other embodiments may not use modules. For example, modules are useful when updating suites or interconnected programs. In that instance, the update process may be more efficient with the flexibility of modules. As another example video updates may be more efficient when modules are used to update the code because only those byte sequences that change from frame to frame are actually updated.

The fields file_name and version_number are reference values.

The process_flag contains directions to the update_manager according to the following code:
0—default—take no action
1—overwrite file
2—execute this file
3—initialize binary editor and process module
4—force the download and overwrite, even if module names do not match
5—special instructions
6—download update_message and display The comment field is added to a log file which may then be reviewed.

The hash is used as an error correction mechanism in a manner described below.

The client and server update_index files may be compared before proceeding further in some embodiments. For example when video or other complex code is being updated, manual or automatic review of the results of the comparison, before the code is updated, may be useful. Alternatively, in other embodiments, the comparison results may be logged for retrieval and review at another time.

Figure 3:
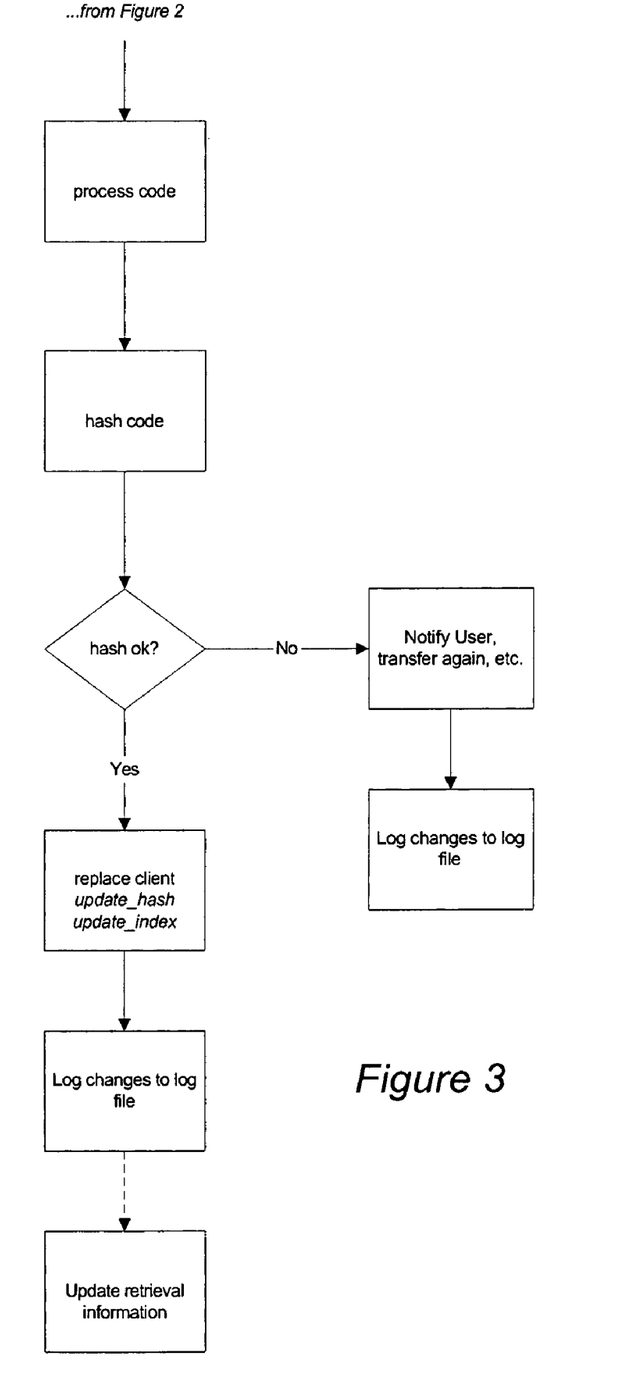
FIG. 3 is a schematic diagram of a process of the preferred embodiment.

The update_manager 11 will then proceed with retrieval of the code from the code server, according to the process flags, and process the code as required, e.g., editing of code on the client system, replacing client code, etc. as shown schematically in FIG. 3.

Depending upon the embodiment, update_manager may process the code in a number of ways. update_manager may process the update using the original client software product code and then, through use of a hash-error correction mechanism such as is further described below, ensure that the updated code is acceptable for use. For example, there may not be enough room in the system to retain a copy of the code. Thus, the original files are replaced as they are updated. Alternatively, update_manager may process the update using a copy of the original client software product code and then replace the original client code with the copy once the code is determined to be acceptable. This processing of a copy of the original client software product code might be necessary where, such as is the case in some working environments, the original code is in use—therefore it cannot be replaced.

After the retrieved code is processed by the update_manager, and the original or copy, depending on the embodiment, of the client side code updated, the client-side code is hashed by the update_manager. The client hash is compared to the hash in the information record of the update_index that was transmitted from the server. If the client hash is different than the downloaded update_index hash the user or administrator is informed that there was corruption in the download and the code should be updated again. If the hash is the same then the file is processed according to the process_flag value. Any changes are written to a log file.

After the processing of the retrieved code, the update_manager updates the client update_hash and update_index with the server update_hash and update_index, respectively, in order to provide information for the next download. All updates are recorded by logging to a log file, on the client, server, another system and/or more than one of these. In addition, the retrieval information (or "http get" of this embodiment) may change, as shown by the dashed line in FIG. 3, if the version number is changed by an update process. For example, if an update forces an upgrade from Version 1.0 to Version 1.1 then after the update is completed, the next update will use the get http://update.cybersoft.com/verygoodprogram/1.1/update_hash. In other embodiments, the retrieval information may change accordingly, using the appropriate address and description. In the preferred embodiments, retrograde updates are also possible, such as moving backwards from version 1.1 to 1.0, as desired, for example, when an update has been improvidently or incorrectly installed on the client system.

Figure 4:
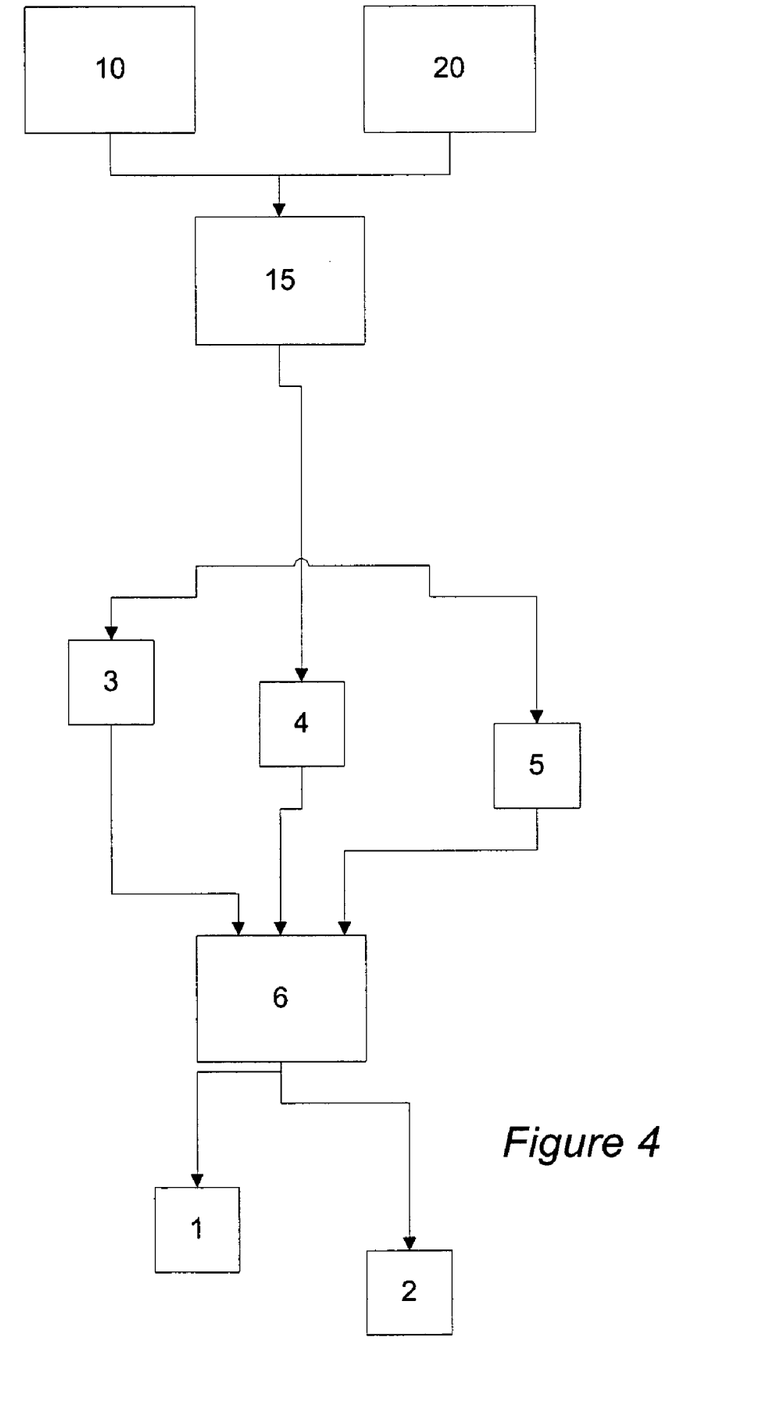
FIG. 4 is a schematic diagram of a process of the preferred embodiment.

FIG. 4 shows a method, used in the preferred embodiment, of constructing server update files. The method of this embodiment may take place on an update server, or another machine, such as a workstation at the software distributor. Of course, in other embodiments, the software distributor may choose to create update code in various manners known in the art.

The software product's old files 10 and the new files 20 are sent to the update creator 15, which may be located on the distributor's system or on another system. The update creator 15 generates update modules, shown as sample modules 3, 4 and 5 in FIG. 4 by any methods known in the art including automated means such as binary comparison, manual means, etc. In the embodiment shown in the Figure the updated modules are created sequentially. The modules are then sent to index and index hash creator 6, which creates the update_index 1, followed by the update_hash 2. It should be noted that this can be entirely an automated process, e.g., a macro process.

The following example is illustrative of the operation of a preferred embodiment.

EXAMPLE

Assume an application named VeryGoodProgram, Version 1.0 exists on the client machine and consists of the following files:

abc1 xyz2

The system also contains the client update_manager, client update_index and client update_hash files, which, in this example, were installed upon initial installation of the program. (These may be installed at any time in various other examples and embodiments.) The client update_index file contains, in this embodiment, the following entries for VeryGoodProgram:

FILE01:abc1:1.0:0:0:XXX1

FILE02:xyz2:1.0:0:0:XXX2

The local update_hash file contains, in this embodiment, the hash for these entries, e.g., X1.

An update according to this example is then automatically executed through the following steps. The update software obtains the update_hash file from the server, which will be compared to the client update_hash file by the update_manager. If another version of software product is available, the hash is different, and the update program will then proceed to download update_index from the server. The downloaded update_index is read by the update_manager. In this example, the update_index file reads:

FILE62:abc1:1.5:3:0:XXY1

FILE63:xyz2:1.5:3:0:XXY2

The update_manager will then proceed with module retrieval of FILE62 and FILE63.

FILE62, in this example, is a module that will be processed by the binary editor, which is a component of the update_manager in the example of this embodiment. Table 1 shows the code for the module. Briefly reviewing each line:

| | |
|---|---|
| VLBBUS 1.0 | This identifies the file as the update command file as well as the appropriate version of the binary editor. If the improper editor version, such as an earlier editor is present on the system, there may be updating difficulties. Therefore, in this embodiment the user will have the option to download an appropriate editor. |
| NAME: FILE62 | This is the module name. |
| ABC1.EXE FROM 2.9 TO 3.0 | This is the filename and the version change. |
| SELF 38209A038FE | This is the hash of this module (minus this line.) This hash will be used by update_manager to verify that the module was not not corrupted in transmission. |
| TARGET 38209DEFD87 | This is a hash of the target file. This hash will be used by the update_manager to ensure that the target files are valid. |

-continued

| | |
|---|---|
| RESULT 37842DEF323 | This is a hash of the resultant file after update. This hash will be used by the update_manager to compare the updated files after the update in order to ensure the update was properly installed. |
| OTHER FROM 2.8 TO 3.0 NAME: FILE63 OTHER FROM 2.7 TO 3.0 NAME: FILE64 OTHER FROM 2.7 TO 3.0 NAME: FILE65 | These are other modules that may be downloaded in an update, such as changes to the operating system kernel, etc. There may be as many of these entries in various examples and embodiments as desired. In other examples and embodiments, there may be references to other update_index files as well, thus providing a referential update_index file structure. |
| OTHER RUNCONTROL: RCF92 | This is an optional run control that may exist within update_manager or another location on the client. It comprises special instructions, e.g. to edit other programs that may be necessary. If the binary editing mechanism cannot by itself make the necessary changes for the update this file may assist with those changes. For example, this may run a Unix ® script to add to or alter the kernel, a Windows ® registry editor, etc. There may be as many of these entries in various other examples and embodiments as desired. |
| HELPER: SETBITS.EXE | This is an optional "helper" program that may exist within update_manager or another location on the client. This may get other files, for the update, etc. There may be as many of these entries in various other examples and embodiments as desired. |
| C@382332, "ABCDEFG", "HIJKLMNOPQRST"# | This is a command to the binary editor. Here, the editor is commanded to change the program code at absolute address 382332 and change the string "ABCDEFG", to the string "HIJKLMNOPQRST." The # is an optional end of command symbol, used to help understand the command line, such as where the command lines might be especially long, for example. |
| C+400, 0XEF, 0XAA | This is another command to the editing program. The editor is instructed to change the hex code EF to AA at the relative address plus 400 bytes. |

The code in the above example was replaced through a bit by bit replacement using a binary editor component of the update_manager. In other embodiments, the binary editor may be a standalone component. Some specialized editing, such as that of data files, may be performed in a different fashion if desired. For example, data files may be updated by prepending or appending data to the data file rather than replacing the entire file.

In certain embodiments, a single module may be used to edit code of more than one file. For example, in the especially preferred embodiments, an update command identifier and version number of the binary editor, as well as a module name, may be used in a single module, with updating instructions for various files contained serially within that single module.

File replacement is also possible in this embodiment, as are the other options identified above.

In other embodiments, an executed update may, as well, force some specific action for any desired reasons. The use of the transmitted data information, for example, may provide to the client or transferee system a signifier or special instruction through a special value. When the client system receives an instruction with the special value a special desired action will be taken. For example, "5" may be used to signify that an "emergency_message" will be downloaded and the contents displayed to the user. In preferred embodiments, the signifier may provide users with desired information. For example, a signifier may initialize a message, displayed to the user, that the client version of the product is obsolete and should be entirely upgraded, that no more updates are available, provide a network alert, that a mandatory update needs to be implemented, etc.

It should be noted that the process of certain preferred embodiments may check for updates manually (through user or another's interaction) or automatically (as defined by the program, at specific intervals, etc.) Moreover, the update software may be installed in the kernel, etc.—that is, the update software is not product specific because it may gather the information from the files. In Windows® NT, 95 or 98, for example, a tool may gather version information from the Registry, because update information may be stored in and/or generated from the Registry. Other directory or system information resources may also contain file names and version numbers, and embodiments may review those as well. Of course, any embodiments may provide feedback to the user, in the form of status reports, requests to review actions that might be taken in the course of the update, information about inconsistencies or errors in the code on the system, notification that the operating system as an improper revision level, review the system for prerequisites to install an update, e.g. update_manager, update_index and index_hash, notification to the user to install the proper software versions, etc.

Any embodiments which obtain or retain file name and version information or any other identifying information from the client machine may also be used to insure file integrity through hashing the data information and comparing the hash to appropriate server software product information. If the hashes do not match, automatic or manual processes may be used to notify the user, correct any problems, etc.

For example, and assuming an embodiment uses a file structure similar to that set forth in the above example, if the server target file hash does not match the client entry in the update_index file, update_manager will search for references to other modules. The server update_index file, in this example, contains other module references to different versions, e.g., OTHER FROM 2.8 TO 2.9 NAME:FILE61. When update_manager encounters this reference, it will download the FILE61 module and check the target hash in that module against the target hash in the client update_index file. If that target hash matches, update_manager will proceed with the update. If not, and other module references to different versions are listed in the client update_index file, then update_manager will continue with the downloads and hash checks for those versions. The embodiment using these version checks may notify the user, administrator or another as this process proceeds, and/or if the appropriate download is not found. This recursive module mechanism of this embodiment provides the client with the information that previous version or versions exist. That information can be used as desired.

Other embodiments, using a different addressing scheme or distribution media, may use a dedicated address scheme or use a URL address scheme in the code and have a translation table for specific variations. For example, a URL can be translated to a local network host which would be the software distributor (a term which includes but is not limited to manufacturer, maintenance organization, ASP, or other entity providing code.)

In embodiments used on local area networks, an intermediate local update server may be used. For example, assume a local area network, such as that on a college campus, of 5000 machines. Installed on each of the 5000 machines is update software according to the preferred embodiments. These 5000 machines, if they each constantly check for updates, would provide a drag on network performance and, if checking for off-site updates, provide a drag on any router, firewall, etc. Therefore, an intermediate local update server would be interposed in the system. This local update server would check the distributor's update server for updates and, in turn, be checked by client machines for updates. Thus the need for each client to constantly poll an external distributor update server is eliminated, network drag is reduced and high-speed updating over the local network is possible.

Some embodiments may provide for processes to occur on the server rather than the client, or vice versa. For example, the initial comparison of the update_hash files may occur on the server rather than the client.

In other embodiments, the initial transmitted "hash" information may be "meta" data information such as a hash or other information format about updated module names, file name(s), version number(s), etc. This meta data information may be generated manually or automatically, and subsequently made available from the server or other distribution media. The term "hash" as used herein is intended to include this type of meta data information.

It should also be understood that a meta file may, in some embodiments, not be used, and data information may be transmitted between target and distribution media, with or without subsequent hashing, compression or other manipulation. Specific embodiments of this type would use XML and/or Java to transmit data information, although any other data transmit mechanism known in the art may be used.

It should also be understood that in some embodiments the hash and the data information may be transmitted in one or more transmissions between the target and distribution media, if desired, and the hash and data information file may be present in a single file.

It should also be understood that certain preferred embodiments may use apparatus, methods and articles of manufacture in order to install software upon the target system, that is, these embodiments may be used where there are few or no software product files present. The update files and systems may then provide installation of one or more software product or other data files.

In view of the many possible embodiments to which the principles of this invention may be applied, it should be recognized that the embodiments described herein are meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

I claim:

1. An apparatus for transmitting data to a target comprising: a means for updating, present on a distribution media, and further comprising data, data information and a cryptographic hash of said data information; a means for transmission between said distribution media and said target, a means for obtaining data information from said distribution media; and, a means for processing said first cryptographic hash of said data information; whereby said means for obtaining data information from said distribution media obtains said first cryptographic hash from said means for updating present on said distribution media, which first cryptographic hash is comprised of a unique data identifier, and is transmitted through said means for transmission to said means for processing, and which upon receipt of said first cryptographic hash of said data information compares said first cryptographic hash to a second cryptographic hash installed on said target in order to determine if said data should be transmitted to said target, said data being less than the content of a file when only portions of a file, and not the entire file itself, require updating, and wherein at least one cryptographic hash is generated at said target and is stored at said target; said stored cryptographic hash corresponding with the data of said target.

2. A computer-implemented method for transmitting data to a target comprising transmitting a first cryptographic hash of data information, which first cryptographic hash is comprised of a unique data identifier, from a first distribution media to said target; comparing said first cryptographic hash in order to determine if data information should be transmitted to said target; transmitting said data information from a second distribution media, if necessary, to said target; comparing said data information with said target in order to determine if said data should be transmitted to said target, wherein said data determined to be transmitted to said target is less than the content of a file when only portions of a file, and not the entire file itself, require updating;

including preparing said data information from attributes of said data, said data information comprising an update index file, wherein said first cryptographic hash of data information comprises a cryptographic hash of said update index file, and wherein comparing said first cryptographic hash in order to determine if data information should be transmitted to said target includes comparing said cryptographic hash of said update index file.

3. A computer-implemented method as in claim 2, further comprising obtaining data information from said second distribution media.

4. A computer-implemented method as in claim 3, wherein obtaining data information from said second distribution media further comprises using an http address to obtain data information.

5. A computer-implemented method for transmitting data as in claim 2, wherein the first and second distribution media are the same.

6. A computer-implemented method for transmitting data as in claim 2, wherein either the first and second distribution media at least partially comprises a network.

7. A computer-implemented method as in claim 2, wherein said data comprises one or more software product files.

8. A computer-implemented method as in 2, further comprising preparing said cryptographic hash from said data information.

9. A computer-implemented method as in 2 further comprising transmitting said data from a third distribution media to said target.

10. A computer-implemented method as in 9 wherein the third distribution media at least partially comprises a network.

11. A computer-implemented method as in 10 further comprising editing data on said target in order to update data on said target.

12. A computer-implemented method for transmitting data to a target comprising the steps of: providing a software product; preparing data information about said software product; preparing a first cryptographic hash of data information about said software product; which first cryptographic hash is comprised of a unique data identifier, storing said software product on a first distribution media; storing said data information on a second distribution media; storing said first cryptographic hash of data information on a third distribution media; obtaining data information about said software product; transmitting said first cryptographic hash of data information to said target; comparing said first cryptographic hash to a second cryptographic hash installed on said target in order to determine if data information should be transmitted to said target; transmitting said data information, if necessary, to said target; comparing said data information with said target in order to determine if said data should be transmitted to said target; transmitting said data, if necessary, to said target; and, editing said data on said target in order to update data on said target.

13. An apparatus for transmitting data to a target comprising: a means for updating, present on a distribution media, and further comprising data, data information and a first cryptographic hash of said data information; a means for transmission between said distribution media and said target, a means for obtaining data information from said distribution media; and, a means for processing said first cryptographic hash of said data information; whereby said means for obtaining data information from said distribution media obtains said first cryptographic hash from said means for updating present on said distribution media, which first cryptographic hash is comprised of a unique data identifier, and is transmitted through said means for transmission to said means for processing, and which upon receipt of said first cryptographic hash of said data information compares said first cryptographic hash to a second cryptographic hash installed on said target in order to determine if said data should be transmitted to said target, said data transmitted to said target comprising an editing command for editing said target.

14. An apparatus for transmitting data to a target comprising: a means for updating, present on a distribution media, and further comprising data, data information and a first cryptographic hash of said data information; a means for transmission between said distribution media and said target, a means for obtaining data information from said distribution media; and, a means for processing said first cryptographic hash of said data information; whereby said means for obtaining data information from said distribution media obtains said first cryptographic hash from said means for updating present on said distribution media, which first cryptographic hash is comprised of a unique data identifier and is transmitted through said means for transmission to said means for processing, and which upon receipt of said first cryptographic hash of said data information compares said first cryptographic hash to a second cryptographic hash installed on said target in order to determine if said data should be transmitted to said target, wherein said data transmitted to said target comprises a binary editing command.

15. A computer-implemented method for transmitting data to a target comprising the steps of: providing a software product; preparing data information about said software product; preparing a first cryptographic hash of data information about said software product; which first cryptographic hash is comprised of a unique data identifier, storing said software product on a first distribution media; storing said data information on a second distribution media; storing said first cryptographic hash of data information on a third distribution media; obtaining data information about said software product; transmitting said first cryptographic hash of data information to said target; comparing said first cryptographic hash to a second cryptographic hash installed on said target in order to determine if data information should be transmitted to said target; transmitting said data information, if necessary, to said target; comparing said data information with said target in order to determine if said data should be transmitted to said target; transmitting said data, if necessary, to said target; and, editing said data on said target in order to update data on said target, wherein said transmitted data comprises one or the other or both of (i) portions of a file and (ii) an editing command to effectuate a change in a file.

16. The method of 1, wherein said data information comprises a module name and a hash of a module name, and wherein said first cryptographic hash is a hash of said data information.

17. The method of 16, wherein said data comprises one or more modules, wherein upon transmission of said data to said target, an update manager performs the steps of extracting said one or more modules and replacing files or byte sequences, wherein said one or more modules contain directions for replacement of byte sequences.

* * * * *